Patented July 12, 1938

2,123,504

UNITED STATES PATENT OFFICE 2,123,504

PROCESS FOR THE PRODUCTION OF CHLOROBUTENES

Harry B. Dykstra, Wilmington, Del., assignor to E. I. du Pont de Nemours & Company, Wilmington, Del., a corporation of Delaware No Drawing. Application April 24, 1937, Serial No. 138,747

15 Claims. (Cl. 260—162)

The invention herein described relates to the manufacture of monohydrochlorides of butadiene and more particularly to the preparation of crotyl chloride from butadiene and hydrogen chloride.

In the past, crotyl chloride has been obtained for the most part by the reaction of hydrogen chloride on crotyl alcohol, which latter is an expensive raw material. In recent years, butadiene has become available in large quantities from petroleum cracking and other sources. A process of producing crotyl chloride in good yield from this material would be of economic value. U. S. Patent No. 1,980,396 describes the reaction of "butadiene bodies" with liquid hydrohalides in the absence of a solvent, but this patent is silent as to details to be followed in the case of butadiene itself. It has been found that the reaction of butadiene with liquid hydrogen chloride proceeds very slowly and incompletely, the product being polymeric in nature, little if any monomeric monochlorobutene being obtained. In U. S. Patent No. 1,790,519 is described a process of treating cracked petroleum products said to contain diolefins with hydrogen chloride. This patent mentions neither crotyl chloride nor the isolation of any particular product. The conditions therein described promote the 1,2-addition of hydrogen chloride to form chloro-3-butene-1

$$(CH_2=CH-CHCl-CH_3)$$

and also perhaps dihydrochloride addition products of butadiene. Under such conditions, the 1,4-addition of hydrogen chloride to form crotyl chloride ($CH_3-CH=CH-CH_2Cl$) would be very slight. In another patent of interest, U. S. Patent No. 1,988,479, it is said that diolefins can be removed from cracked petroleum products containing them by reaction with large quantities of cuprous chloride, optionally in the presence of small amounts of hydrogen chloride as a catalyst. In this process, the cuprous chloride addition products of butadiene rather than the hydrogen chloride addition products are obtained. In both of these last two patents, the purpose of the process is the removal of diolefins from cracked petroleum products rather than the production of useful diolefin reaction products. There is further mention in the literature of reactions between hydrohalides and dienes such as butadiene, isoprene and phenyl-1-butadiene-1,3 but the reports are conflicting in nature. Experiments following the teachings of such processes lead to the conclusion that there is no general law covering such reactions but that the type of addition obtained is dependent upon the specific compounds and the method of carrying out the reaction. None of the processes provide a satisfactory means of making crotyl chloride when applied to hydrogen chloride and butadiene. The prior art does teach a method for the production of crotyl bromide from hydrogen bromide and butadiene. Thus, in U. S. Patent No. 1,725,156 it is shown that crotyl bromide is obtainable in good yield from hydrogen bromide and butadiene in acetic acid solution (see also J. Prakt. Chem. (2) 67 420 (1903)). When this process was tried, using hydrogen chloride in place of hydrogen bromide, it was found that the reaction was slow, and the product obtained consisted principally of chloro-3-butene-1 instead of the expected crotyl chloride, although the latter was present in small amounts. In this reaction, the butadiene seemed to behave in a manner similar to isoprene and phenyl-1-butadiene-1,3, which according to some authors, with hydrogen chloride undergo principally or entirely 1,2-addition. (See respectively Kondakow, J. Russ. Phys. Chem. Soc. 21, 36 (1889) and Muskat & Huggins, J. Am. Chem. Soc. 56, 1239 (1934)).

An object of this invention is to provide a cheap and convenient method for making crotyl chloride. A further object is the production of crotyl chloride from butadiene and from cracked petroleum products containing butadiene. A still further object is the directionally controlled addition of hydrogen chloride to butadiene to produce crotyl chloride as the principal product of the reaction. Other objects will appear hereinafter.

It has now been found that these objects can be accomplished by reacting hydrogen chloride with butadiene in the presence of an inert liquid diluent, which is preferably a polar liquid and a solvent for hydrogen chloride, and in the presence of a catalytic amount of a salt of a polyvalent metal below calcium in the electromotive series. Copper, zinc, and bismuth salts and the chlorides of all of these metals are particularly effective as catalysts for the 1,4-addition. The salts of copper, especially cuprous chloride, have been found to be the most effective catalysts.

The catalysts just mentioned appear to have a triple function. They increase the rate of reaction; they cause chloro-3-butene-1, after it is formed, to isomerize to crotyl chloride; they cause 1,4- rather than 1,2-addition to tend to take place. These separate effects all contribute to the final desired results, viz., a higher ratio of crotyl chloride in the reaction product. As a specific illustration, when no catalyst is used, the ratio of 1,4-addition product to 1,2-addition product is approximately 0.2:1, whereas, in the presence of cuprous chloride, this ratio is about 6:1. It is desirable to use the butadiene and hydrogen chloride in approximately molecular proportions although an excess of either may be used. When the hydrogen chloride and butadiene are used in molecular proportions, the mono-addition products are formed almost exclusively. Use of an excess of hydrogen chloride leads to the formation of some higher boiling products, such as the dihydrochloride.

A convenient method for reacting hydrogen chloride with butadiene consists in preparing a concentrated solution of hydrogen chloride in a polar solvent for the hydrogen chloride, such as acetic or other lower fatty acid or water, adding the catalyst, introducing a quantity of butadiene molecularly equivalent to or slightly in excess of the hydrogen chloride present, and then allowing the mixture to react in a closed system until reaction is substantially complete. The course of the reaction can be followed by removing samples from time to time and titrating the free hydrogen chloride present. When the reaction is carried out at room temperatures, the hydrogen chloride is generally consumed within 18 hours, but a longer reaction period tends to increase the ratio of the 1,4- to the 1,2-products. At a more elevated temperature, e. g. 50–100° C., the reaction is complete in a shorter period. For large scale manufacture of crotyl chloride, it is more convenient to introduce hydrogen chloride and butadiene under pressure into an autoclave containing the diluent and catalyst. The products of the reaction are separated by distillation. Generally, however, it is desirable to remove the solvent prior to distillation. A more detailed description of the method is given in the examples which follow.

The optimum rate of addition of hydrogen chloride to butadiene is dependent among other things upon the temperature, concentration of the reactants, and the catalyst used. The effect of these factors is shown in the table which records the results of a number of experiments made in acetic acid solution, using equimolecular quantities of butadiene and hydrogen chloride and a catalyst to butadiene ratio of 1:14 by weight.

TABLE

Reaction of HCl with butadiene in acetic acid

| Conc. of HCl in percent | Catalyst | Temp. °C. | Time in hours | HCl consumed in percent | Ratio of 1,4 to 1,2 products |
|---|---|---|---|---|---|
| 5 | None | 25 | 192 | 47 | 0.2:1 |
| 10 | None | 25 | 24 | 47 | 0.2:1 |
| 10 | BiCl₃ | 25 | 24 | 55 | 1.2:1 |
| 10 | BiCl₃ | 33 | 24 | 69 | 1.2:1 |
| 13.5 | None | 30 | 40 | 69 | 0.2:1 |
| 13.5 | NiCl₂ | 30 | 40 | 75 | 0.3:1 |
| 13.5 | AlCl₃ | 30 | 40 | 75 | 0.7:1 |
| 13.5 | ZnCl₂ | 30 | 40 | 91 | 1.7:1 |
| 13.5 | CuCl₂ | 30 | 40 | 90 | 4.7:1 |
| 13.5 | CuSO₄ | 30 | 40 | 93 | 4.9:1 |
| 13.5 | Cu₂Cl₂ | 30 | 40 | 99 | 6.5:1 |
| 13.5 | Cu₂Cl₂ | 30 | 18 | 99 | 3.7:1 |

It will be observed from the above table that in the absence of a catalyst the product is chiefly chloro-3-butene-1, this being true for several HCl concentrations and for several different periods of reaction. The table also shows that whenever the catalyst is present and other concentrations are comparable, the reaction is more rapid and a higher ratio of crotyl chloride is found in the product. The table further shows the copper salts, especially cuprous chloride, to be particularly effective in both speeding up the reaction and in favoring 1,4-addition. Finally it shows that a longer reaction time increases the amount of crotyl chloride in the reaction product; this is undoubtedly due to the action of the catalyst in isomerizing chloro-3-butene-1, after it is formed, to crotyl chloride. In the latter connection, it is interesting to note that Baudrenghien in Bull. Soc. Chem. Belg. 31, 160 (1932) has stated that chloro-3-butene-1 rearranges to croytl chloride when heated with water at 85° C. It has been found that this reaction is rather slow and is attended with side reactions which result in a loss of chloride. For example, 25 hours' refluxing of a mixture of 83 parts by weight of chloro-3-butene-1 and 25 parts by weight of water gave a mixture from which 19 parts of crotyl chloride (23% conversion) and 32 parts of chloro-3-butene-1 were obtained which is equivalent to a 0.6:1 ratio of 1,4- to 1,2-product. It has been found that copper salts catalyze the rearrangement of chloro-3-butene-1 to crotyl chloride even at low temperatures. When chloro-3-butene-1 was shaken with a small amount of cuprous chloride for 18 hours at 25° C., the ratio of crotyl chloride to chloro-3-butene-1 obtained on distillation was 1.4:1. Use of an equal weight of acetic acid as solvent increased the ratio to 2:1. Better conversions are obtained by using more dilute solutions. The other catalysts herein disclosed also promote this rearrangement.

Specific examples illustrating the preparation of crotyl chloride are given below. Parts given are by weight. These examples are merely by way of illustration and should not be construed as limiting the invention.

*Example I*

Twenty-nine (29) parts of hydrogen chloride are dissolved in 185 parts of acetic acid, after which 44 parts of butadiene and 3 parts of cuprous chloride are added and the mixture shaken in a glass reactor at 30° C. After 24 hours' shaking, titration of a sample of the mixture with a standard solution of sodium acetate in acetic acid shows that 98% of the hydrogen chloride has reacted. The mixture is then treated with water which causes the butadiene addition products to form an upper layer. The upper layer is separated and treated by washing with dilute sodium carbonate solution, drying over calcium chloride, and fractionally distilling. The upper layer yields 51 parts of crotyl chloride and 10 parts of chloro-3-butene-1. This represents an 84% yield of monohydrochlorides and a 5.1:1 ratio of the 1,4- to the 1,2-addition product. The chloro-3-butene-1 obtained in this way has the properties B. P. 64° C., $d_4^{20}$ 0.8987, and $N_D^{20}$ 1.4156, whereas the corresponding values observed by Baudrenghien are B. P. 64° C., $d_4^{20}$ 0.8976, and $N_D^{20}$ 1.4149. Crotyl chloride obtained in this way has the properties B. P. 84° C., $d_4^{20}$ 0.9251, and $N_D^{20}$ 1.4341 whereas Baudrenghien's values are B. P. 84° C., $d_4^{20}$ 0.9282, and $N_D^{20}$ 1.4350.

*Example II*

A mixture of 38 parts of butadiene, 26 parts of hydrogen chloride, 164 parts of acetic acid, and 3 parts of cuprous chloride is shaken for 40 hours at 25–35° C. Ninety percent of the hydrogen chloride reacts during this period. When the reaction mixture is worked up as in Example I, 42 parts of crotyl chloride and 9 parts of chloro-3-butene-1 are obtained, representing an 81% yield of monohydrochlorides. The ratio of the 1,4- to the 1,2-addition product in this case is 4.7:1.

*Example III*

Following the method described in Example II, a mixture of 38 parts of butadiene, 26 parts of hydrogen chloride, 164 parts of acetic acid, and 3 parts of hydrated copper sulfate is reacted at 25–35° C. for 40 hours. Ninety-three percent of the hydrogen chloride reacts during this period. After removing the acetic acid by washing with water and distilling the water-insoluble portion, 39 parts of crotyl chloride and 8 parts of chloro-3-butene-1 are obtained, representing a 74% yield of monohydrochlorides and a ratio of 1,4- to 1,2-product of 4.9:1.

*Example IV*

Forty-five (45) parts of a C₄ fraction of gases obtained from petroleum cracking (consisting largely of butylenes but containing about 20% of butadiene) is reacted with a mixture of 29 parts of hydrogen chloride, 185 parts of acetic acid, and 3 parts of cuprous chloride at 30° C. for 40 hours. Fifty-nine (59) percent of the hydrogen chloride reacts under these conditions. On working up the reaction mixture as in the preceding experiments, there is obtained in addition to low boiling chloride, principally tertiary butyl chloride, 4 parts of pure crotyl chloride. This represents a 27% yield on the assumption that the original gas contained 20% of butadiene.

*Example V*

A mixture of 40 parts of butadiene, 140 parts of concentrated hydrochloric acid (specific gravity 1.19), 20 parts of cuprous chloride, and 8 parts of ammonium chloride is shaken at 25–30° C. for 40 hours. The upper organic layer is then separated, dried over calcium chloride, and distilled. There is obtained 26 parts of crotyl chloride and 8 parts of chloro-3-butene-1, together with 13 parts of higher boiling material. The yield of monohydrochlorides in this case is 61%, and the ratio of the 1,4- to the 1,2-product is 3.3:1.

*Example VI*

A mixture of 44 parts of butadiene, 29 parts of hydrogen chloride, and 185 parts of acetic acid is kept in a closed container at 30–40° C. until the major portion of the hydrogen chloride has reacted. Treatment of a small portion of the mixture at this stage, after the manner described in Example I, reveals that crotyl chloride and chloro-3-butene-1 are present in the ratio of about 1:5. The remainder of the reaction mixture is then shaken with 3 parts of cuprous chloride for two days at 30–40° C. The mixture is diluted with water and the upper insoluble portion dried over calcium chloride and distilled. This gives crotyl chloride and chloro-3-butene-1 in a ratio of about 5:1.

*Example VII*

A mixture of 44 parts of butadiene, 29 parts of hydrogen chloride and 185 parts of acetic acid is reacted in a closed container for 40 hours at 30° C. Analysis of a test portion of the reaction mixture indicates a 69% yield of butadiene monohydrochlorides, the ratio of 1,4- to 1,2-products being 0.2:1. The 1,2-product, i. e., chloro-3-butene-1, is separated from the mixture by distillation. It is then diluted with acetic acid and shaken with a small amount of cuprous chloride for 18 hours at 30° C. On separating the monohydrochlorides from the mixture by dilution with water and subjecting them to fractional distillation in the usual way, the chief product is found to be crotyl chloride.

While polar liquids which are solvents for hydrogen chloride are most suitable for use as diluents in the preparation of crotyl chloride from butadiene and hydrogen chloride, non-polar liquid solvents for hydrogen chloride may also be used. In fact, it is within the scope of the present invention to use any liquid diluent which is inert: i. e., chemically nonreactive toward the reactants and reaction products under the conditions of the reaction. As examples may be mentioned octane, cyclohexane, acetone, ether, alcohol, and propionic acid, and mixtures of these with each other or with polar liquids.

As catalysts for the present process, may be used salts of any polyvalent metal below calcium in the electromotive series, among them the chlorides, nitrates, bromides, iodides, sulfates, acetates, sulfites, thiosulfates, and phosphates of such metals as copper, cobalt, manganese, magnesium, zinc, aluminum, iron nickel, antimony, lead, tin, and bismuth. Suitable specific catalysts are given in the table and in the examples: others are ferric chloride, antimony trichloride, stannous chloride and cuprous acetate. Salts of organic acids and of weak acids generally, probably revert at least in part to chlorides in the presence of hydrochloric acid. The salts of copper, zinc, and bismuth, especially their chlorides, are the preferred catalysts. The salts of copper are especially preferred catalysts, particularly cuprous chloride. When other metals are used, the chlorides thereof are preferred to other salts. The amount of catalyst used may be varied over very wide ranges, though from 0.5 to 10% by weight based on the butadiene, is preferred and gives generally satisfactory results.

Oxidizing agents, particularly peroxides such as benzoyl peroxide, urea peroxide, and ascaridole, if present, tend to retard the 1,4-addition while antioxidants, such as catechol, hydro-quinone, diphenylamine and p-triocresol, favor the 1,4-addition. It is therefore often desirable to introduce antioxidants into the reaction mixture to increase the yield of crotyl chloride. Similarly, if chloro-3-butene-1 is desired, oxidants may advantageously be introduced.

As already indicated, the present catalytic reaction of hydrogen chloride with butadiene in the presence of a liquid diluent can be carried out under a variety of conditions. The reaction takes place at comparatively low temperatures, e. g., 0° C., but it is preferable to operate at a more elevated temperature, the range 20 to 100° C. being very suitable. The use of superatmospheric pressure is desirable since it permits the use of a high concentration of reactants. It is also within the scope of the invention to carry out the reaction as a continuous process by introducing hydrogen chloride and butadiene into a suitable liquid at such a temperature that the monohydrochloride formed distills from the reaction mixture.

While crotyl chloride now appears to be the more useful of the mono-chloro-butenes, it should be remembered that the process herein described also affords a good method for preparing chloro-3-butene-1. When it is desired to prepare chloro-3-butene-1 in good yield, the process of the above examples should be carried out without a catalyst; see the table, first, second and fifth lines. This yield can be further improved by using a non-polar diluent such as octane, cyclohexane, acetone, etc. Moreover, as already mentioned, the addition of an oxidant such as benzoyl peroxide diverts the reaction still further toward the 1,2-addition.

The invention herein described affords a simple and direct method for the preparation of crotyl chloride from cheap and readily available materials. Crotyl chloride is a reactive and highly useful organic halide. For example, it has been employed in the preparation of crotyl cellulose, crotyl butyl phthalate, crotyl phenol, and other compounds which are useful in coating and molding compositions. The invention also affords a method for converting the by-product, chloro-3-butene-1 into crotyl chloride.

It is apparent that many widely different embodiments of this invention may be made without departing from the spirit and scope thereof and, therefore, it is not intended to be limited except as indicated in the appended claims.

I claim:

1. A process which comprises reacting butadiene with hydrogen chloride in the presence of an inert liquid diluent and a catalytic amount of a salt of a polyvalent metal below calcium in the electromotive series.

2. A process which comprises reacting butadiene with hydrogen chloride in the presence of an inert polar liquid which is a solvent for hydrogen chloride and in the presence of a catalytic amount of a chloride of a polyvalent metal below calcium in the electromotive series.

3. A process which comprises reacting butadiene with hydrogen chloride in substantially equimolecular proportions in the presence of an inert polar liquid which is a solvent for hydrogen chloride and in the presence of a catalytic amount of a salt of a polyvalent metal below calcium in the electromotive series, and isolating and separating the resulting monochlorobutenes.

4. A process which comprises reacting butadiene with hydrogen chloride in substantially equimolecular proportions in the presence of an inert polar liquid which is a solvent for hydrogen chloride and in the presence of a catalytic amount of a chloride of a polyvalent metal below calcium in the electromotive series, and isolating the resulting crotyl chloride.

5. A process which comprises reacting butadiene with hydrogen chloride in substantially equimolecular proportions in the presence of an inert polar liquid which is a solvent for hydrogen chloride and in the presence of a catalytic amount of a chloride of a metal selected from the group consisting of copper, zinc, and bismuth, and isolating the resulting crotyl chloride.

6. A process which comprises reacting butadiene with hydrogen chloride in substantially equimolecular proportions in the presence of an inert polar liquid which is a solvent for the hydrogen chloride and in the presence of a catalytic amount of a copper salt and isolating the resulting crotyl chloride.

7. A process which comprises reacting butadiene with hydrogen chloride in the presence of an inert polar liquid which is a solvent for the hydrogen chloride and in the presence of a catalytic amount of cuprous chloride.

8. A process which comprises reacting butadiene with hydrogen chloride in substantially equimolecular proportions in the presence of an inert polar liquid which is a solvent for the hydrogen chloride and in the presence of a catalytic amount of cuprous chloride and isolating the resulting crotyl chloride.

9. A process which comprises reacting butadiene with hydrogen chloride in substantially equimolecular proportions in the presence of an inert polar liquid which is a solvent for the hydrogen chloride and in the presence of cuprous chloride in the amount of from 0.5% to 10% by weight of the butadiene and isolating the resulting crotyl chloride.

10. A process which comprises reacting butadiene with hydrogen chloride in substantially equimolecular proportions in the presence of an inert polar liquid, which is a solvent for the hydrogen chloride, in the presence of cuprous chloride in an amount of from 0.5% to 10% by weight of the butadiene, and in the presence of an antioxidant, while maintaining the temperature of the reaction in the range of from 20° C. to 100° C., and while maintaining a superatmospheric pressure and isolating the resulting crotyl chloride.

11. A process which comprises reacting hydrogen chloride with butadiene in the presence of an inert liquid diluent, separating chloro-3-butene-1 from the reaction mixture, treating the chloro-3-butene-1 with a catalytic amount of a salt of a polyvalent metal below calcium in the electromotive series and isolating the resulting crotyl chloride.

12. In the production of crotyl chloride, the step which comprises treating chloro-3-butene-1 with a catalytic amount of a salt of a polyvalent metal below calcium in the electromotive series.

13. In the production of crotyl chloride, the step which comprises treating chloro-3-butene-1 with a catalytic amount of the chloride of a metal selected from the group consisting of copper, zinc, and bismuth and isolating the resulting crotyl chloride.

14. In the production of crotyl chloride, the step which comprises treating chloro-3-butene-1 with a catalytic amount of a copper salt.

15. In the production of crotyl chloride, the step which comprises treating chloro-3-butene-1 with a catalytic amount of cuprous chloride.

HARRY B. DYKSTRA.